J. A. MYERS.
SPINDLE JOINT FOR AUTOMOBILES AND OTHER VEHICLES.
APPLICATION FILED OCT. 17, 1908.
922,939.
Patented May 25, 1909.
2 SHEETS—SHEET 1.
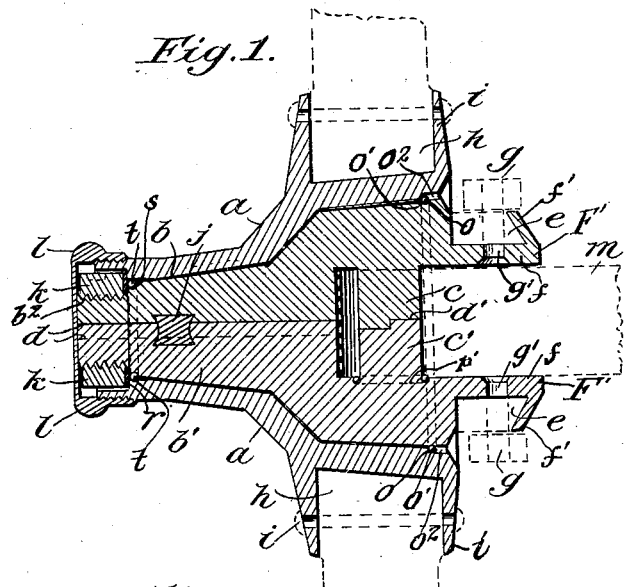
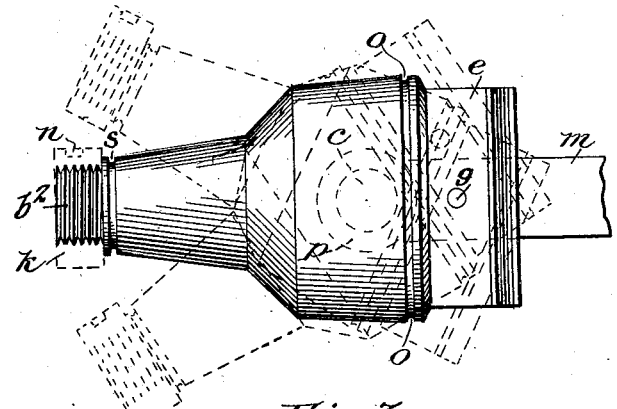
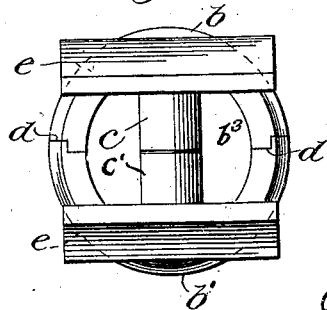
Witnesses:
August. Roy.
John Newman
Inventor:
John August Myers

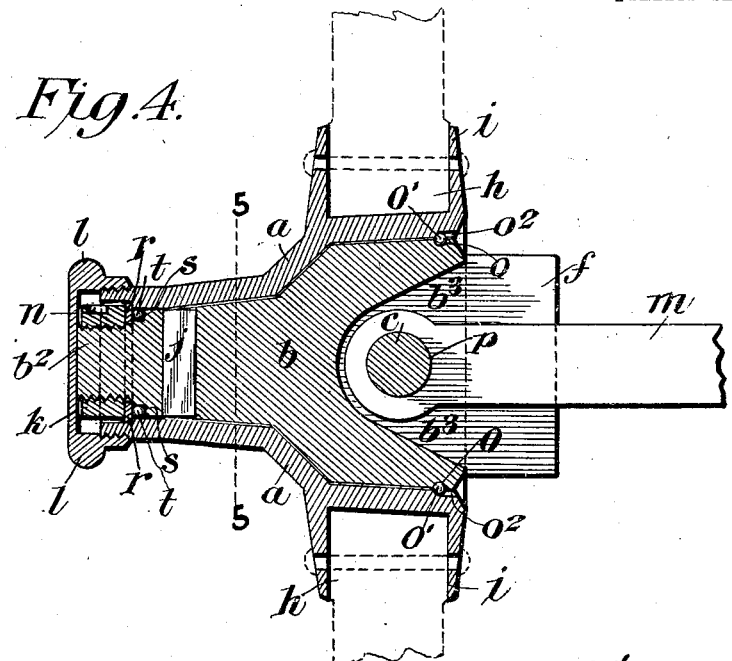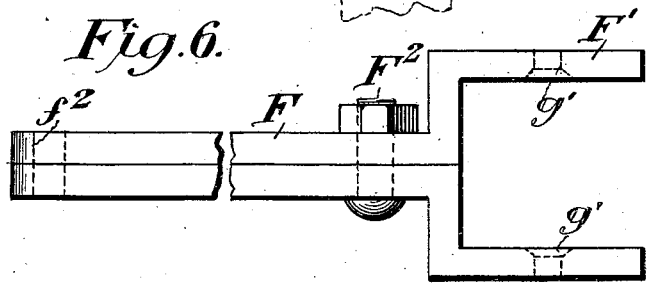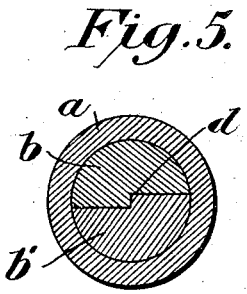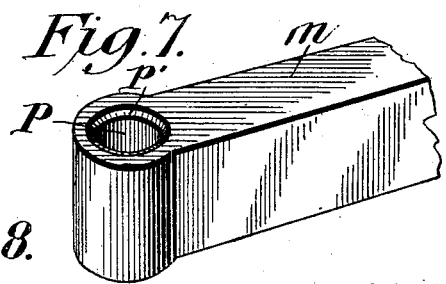

UNITED STATES PATENT OFFICE.

JOHN AUGUST MYERS, OF BRADDOCK, PENNSYLVANIA.

SPINDLE-JOINT FOR AUTOMOBILES AND OTHER VEHICLES.

No. 922,939.   Specification of Letters Patent.   Patented May 25, 1909.

Application filed October 17, 1908. Serial No. 458,317.

*To all whom it may concern:*

Be it known that I, JOHN AUGUST MYERS, a citizen of the United States, residing at Braddock, in the county of Allegheny and State of Pennsylvania, have invented a new and useful Spindle-Joint for Automobiles and other vehicles, of which the following is a specification.

My invention relates to the running gear of vehicles, and particularly to the steering mechanism thereof, my invention being designed to improve and simplify that class of steering structure wherein the axle is pivotally connected to the hub internally of the latter.

The object of my invention is to provide a two-part spindle for steering vehicle wheels which is adapted to have pivotal engagement with the axle and be held in its engagement therewith by an inclosing rotatable hub, and, further, to provide a hub which is rotatable around the spindle on ball bearings.

The invention consists in the arrangement of parts and details of construction described in the accompanying specification and specifically set forth in the appended claims.

In the drawings, Figure 1 is a longitudinal section on a vertical plane of my improved axle spindle and hub; Fig. 2 is a top view of the spindle detached from the hub; Fig. 3 is a rear elevation of the spindle; Fig. 4 is a longitudinal section of the spindle and hub on a horizontal plane; Fig. 5 is a section of Fig. 4, on the line 5—5; Fig. 6 is a side elevation of the steering yoke; Fig. 7 is a perspective view of the end of the axle, the axle being reversed in position from the normal in order to show the race-way in the lower end of the axle eye; Fig. 8 is a perspective of the key for attaching the two parts of the spindle together.

My design is to provide a hub for vehicles by which the wheel may be turned independently of the axle, and to that end I provide a hollow or annular hub, $a$, inclosing a spindle circular in section and composed of two upper and lower longitudinal halves, $b$, $b'$, the spindle being divided on a horizontal plane. The outer end of the hollow hub $a$ is tapered and the spindle as a whole is correspondingly tapered and its outward end is reduced and screw threaded, as at $b^2$. The spindle is held together at its outward end by a nut $k$, and by a transverse key $j$, whose opposed sides are longitudinally channeled so that the key has a double dovetailed form. This key fits in alining transverse dovetailed grooves formed in the adjoining faces of the sections $b$, $b'$, as shown clearly in Fig. 1. It is obvious that when this key is inserted in place that the sections of the spindle will be held securely together. The rear end of the spindle is chambered as at $b^3$, for the reception of the axle $m$. The axle as shown in Figs. 4 and 7 is enlarged at its end and has an eye $p$ passing vertically through this enlargement. The walls of the chambered portion of the spindle are outwardly and laterally inclined or flared as will be seen from Fig. 4 to permit the spindle to turn in a horizontal plane upon the axle. The section $b$ of the spindle has a downwardly-projecting cylindrical pivot post $c$ which extends partly through the chamber $b^3$ and the section $b'$ has a corresponding upwardly projecting cylindrical post, $c'$, which abuts against the lower end of the post $c$, these two projecting posts in alinement with each other thus coacting to form a pivot pin which passes through the eye $p$ and on which the spindle turns.

It will be seen from Figs. 3 and 4 that while the chamber $b^3$ is only as deep as the thickness of the axle $m$, it is considerably wider at its outer end than the width of the axle, thus allowing the spindle to turn on the axle to the position shown in dotted lines in Fig. 2.

In order to more securely hold the sections $b$, $b'$ in engagement with each other, the sections are longitudinally scarfed as at $d$ along the middle of their contacting faces as shown in the section Fig. 5. The contacting ends of the posts $c$, $c'$ are also scarfed as at $d'$, but in this latter case transversely to the axis of the spindle.

To provide for the attachment of a steering gear to the spindle, I form each one of the sections $b$, $b'$ with the horizontally-extending outwardly-projecting flat flanges, $f$, each having an upwardly and inwardly bent flange $f'$. These flanges form upper and lower horizontal recesses, $e$, into which two spaced parallel yoke arms, $F'$, of a steering gear $F$ are attached by bolts, $g$, passing through holes, $g'$. The yoke is made in two halves attached together by a bolt, $F^2$, and is connected to any form of steering mechanism by a pivot bolt (not shown) passing through a hole $f^2$.

The hub, $a$, as before stated, is hollow, and tapers toward its outer end to fit over the tapered end of the spindle. Its small end is screw-threaded on its exterior for engagement with the cap $l$ and on its interior it is enlarged to receive the nut $k$, and to form a shoulder. A washer $r$ is located between the inner face of the nut $k$ and the shoulder, and adjacent to the washer is a race, $s$, formed on the circumference of the spindle close to the shoulder. This race contains the balls $t$ which bear against the outer end of the hub $a$, and support it on the spindle. These balls also bear against the washer $r$, thereby relieving the nut $k$ from any wear. At its inner end the spindle is also provided with a race-way, $o$, carrying balls, $o'$, supporting the inner end of the hub. Oil openings, $o^2$, lead to this race-way. The lower end of the eye, $p$, is expanded as at $p'$ to form a race-way surrounding the base of the post, $c'$, and supporting the axle upon the spindle. The nut $k$ is formed with a recess $n$ whereby a wrench may be applied to the nut for turning it.

The hub is formed with parallel outstanding walls $i$ forming sockets in which the spokes $h$ shown in dotted lines are received, the spokes being bolted in place as shown. The manner in which the spokes are attached to the hub, however, may be varied in many ways without departing from the spirit of my invention.

The operation of my invention is clear from what has gone before. By detaching the cap $l$ and nut $k$, the hub may be easily withdrawn from the spindle, and by detaching the key $j$ and the steering yoke, the sections of the spindle may be separated to detach the spindle from the axle. By a reverse operation, the spindle may be as easily attached to the axle and the wheel placed in position thereon.

My invention is simple, is easily put in place and detached, provides a pivotal bearing for the wheel, which is in line with the spokes thereof, and provides for a turning of the wheel entirely independent of the axle. The hub rotates upon the spindle on ball bearings and the spindle having also a ball bearing engagement with the axle, the wheel may be pivotally turned very easily.

While I have shown what I believe to be the best means of attachment of the steering yoke to the wheel, I do not wish to limit myself to this, as it is obvious that this portion of my invention may be varied in many ways without departing from the essential principle thereof.

Having thus described my invention, what I claim as new and desire to secure by Letters-Patent, is:

1. A vehicle running gear having a spindle formed of two interlocked sections, the inner ends of said sections being mutually chambered and formed with a vertically extending pivot post, the inner ends of the sections being provided with outwardly projecting transversely extending horizontal flanges, in combination with an axle having a cylindrical end and an eye through which said pivot post passes, and a steering yoke engaging with the outwardly projecting horizontal flanges of the sections.

2. A vehicle running gear having a spindle formed of an upper and a lower section interlocked with each other, the inner ends of said section being mutually chambered and each formed integral with a vertically extending section of a two part pivot post, both sections of which are in alinement, in combination with an axle having a cylindrical end formed with an eye through which said post passes.

3. A vehicle running gear having a spindle formed of an upper and a lower section interlocked together, the inner end of said sections being chambered and formed with a vertical sectional pivot post, in combination with an axle having a cylindrical end formed with an eye through which said post passes, and a hub surrounding the spindle to rotate thereon, said hub having a cap at its outer end closing over the outer end of the spindle.

4. A vehicle running gear having a spindle formed of an upper and a lower section, the outer ends of the sections having contacting faces, the inner ends of both of said sections being mutually chambered and formed with a vertically extending pivot post, in combination with an interlocking device engaging with both of said sections across their contacting faces, an axle having a cylindrical end formed with an eye through which the pivot post passes, and a hub surrounding and rotatable upon the spindle, the inner surface of the hub and the outer surface of the spindle being mutually formed with race-ways and anti-friction bearings carried in said race-ways.

5. A vehicle running gear having a spindle formed of two sections, the inner end of said sections being chambered and formed with a vertical pivot post, the contacting faces of the sections having registering oppositely-dovetailed grooves, and a key oppositely dovetailed in cross section adapted to be inserted in said grooves to interlock the sections with each other, in combination with an axle having a cylindrical end formed with an eye through which the pivot post passes and a hub surrounding the spindle and adapted to be rotated thereon.

6. A vehicle running gear having a spindle formed of two interlocked sections, the inner end of said sections being chambered and formed with a vertical sectional pivot post, a key passing transversely through the contacting faces of both of said sections and locking them together, a nut surrounding the outer end of both of said sections, a hub surrounding the spindle and recessed at its outer end to accommodate said nut, said hub being rotatable around the spindle, and an axle having a cylindrical end projecting into said chambered portion of the spindle and formed with an eye through which the pivot post passes.

7. A vehicle running gear having a spindle formed of an upper and a lower section, the adjacent faces of the section being longitudinally scarfed, a key passing transversely through the adjacent portion of both sections and locking the same together, the rear portions of both sections being mutually chambered and being provided with vertically extending alining pivot post sections projecting into and across said chamber, the contacting ends of said post sections being scarfed, an axle having a cylindrical end formed with an eye through which said post passes, a hub surrounding the spindle and rotatable therearound, and a nut surrounding the outer ends of the spindle sections and holding the hub in place thereon.

8. A vehicle running gear having a spindle formed of two interlocked sections, the inner end of said sections being chambered and formed with a vertical sectional pivot post, said sections each having an outwardly-projecting horizontally-extending flange, in combination with a steering yoke attached to said flanges, an axle extending between said flanges and having an eye through which the pivot post passes, and a hub rotatably mounted upon the spindle.

9. A vehicle running gear having an outer rotatable hub and an inner sectional spindle upon which the hub rotates, the rear end of said spindle being chambered and formed with a vertically-extending pivot post passing through said chamber, in combination with an axle having an enlarged end formed with an eye through which said post passes, this enlarged axle end being formed with a race-way at the junction of its inner circumference with the lower face of the axle, said race-way being provided with anti-frictional balls supporting the axle upon the spindle and engaging with the pivot post.

10. A vehicle running gear having a spindle formed of an upper and a lower section, a key passing through the adjacent portion of said sections and holding them together, a nut on the outer end of the sections, a washer interior of the nut, anti-friction balls carried in the race-way around the said section inward of the washer, a hub surrounding the spindle and rotatable thereon, the rear end of said hub and spindle being mutually circumferentially channeled to form a race-way, anti-friction balls carried in said channel and supporting the rear end of the hub on the spindle, an axle extending into a chamber formed in the rear end of the spindle, a pivot post passing downward through said chamber and engaging with said axle, and flanges projecting from the rear of each of the sections forming means for the attachment of a steering yoke.

JOHN AUGUST MYERS.

Witnesses:
August Roy,
John Newman.